(12) United States Patent
Petitpas et al.

(10) Patent No.: US 10,479,678 B2
(45) Date of Patent: Nov. 19, 2019

(54) ORTHO-$H_2$ REFUELING FOR EXTENDED CRYOGENIC PRESSURE VESSEL DORMANCY

(71) Applicant: Lawrence Livermore National Security, LLC, Livermore, CA (US)

(72) Inventors: Guillaume Petitpas, Livermore, CA (US); Salvador M. Aceves, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 530 days.

(21) Appl. No.: 14/278,688

(22) Filed: May 15, 2014

(65) Prior Publication Data
US 2015/0330573 A1   Nov. 19, 2015

(51) Int. Cl.
| | |
|---|---|
| *C01B 3/00* | (2006.01) |
| *F17C 5/06* | (2006.01) |
| *F17C 7/00* | (2006.01) |
| *F17C 5/02* | (2006.01) |

(52) U.S. Cl.
CPC ............ *C01B 3/0089* (2013.01); *F17C 5/02* (2013.01); *F17C 5/06* (2013.01); *F17C 7/00* (2013.01); *F17C 2205/0364* (2013.01); *F17C 2221/012* (2013.01); *F17C 2223/0161* (2013.01); *F17C 2223/033* (2013.01); *F17C 2225/0161* (2013.01); *F17C 2225/033* (2013.01); *F17C 2227/0135* (2013.01); *F17C 2260/036* (2013.01); *F17C 2260/056* (2013.01); *F17C 2265/00* (2013.01); *F17C 2265/065* (2013.01); *F17C 2270/0139* (2013.01); *F17C 2270/0178* (2013.01); *F17C 2270/0184* (2013.01); *F17C 2270/0581* (2013.01); *Y02E 60/321* (2013.01)

(58) Field of Classification Search
CPC ........ F17C 5/06; F17C 7/00; F17C 2221/012; F17C 2265/00; F17C 2270/0581; C01B 3/0089
USPC .............................. 141/2; 62/607, 51.2, 46.1
See application file for complete search history.

(56) References Cited

U.S. PATENT DOCUMENTS

| | | | |
|---|---|---|---|
| 2,943,917 A * | 7/1960 | Weitzel ................. | C01B 3/0089 423/649 |
| 2,984,630 A * | 5/1961 | Braithwaite ............. | B01J 21/04 502/303 |
| 3,304,728 A | 2/1967 | De Haan et al. | |

(Continued)

OTHER PUBLICATIONS

Lordgooei et al., "An Optimization Study of Liquid Hydrogen Boil-Off Losses," Int. J. Hydrogen Energey, vol. 17, No. 3 pp. 227-236 (1992).

*Primary Examiner* — Timothy L Maust
*Assistant Examiner* — James R Hakomaki
(74) *Attorney, Agent, or Firm* — Eddie E. Scott

(57) ABSTRACT

A cryogenic hydrogen storage system reduces hydrogen loss by providing an initial supply of hydrogen wherein the initial hydrogen has an initial para/ortho hydrogen ratio. The initial hydrogen having an initial para/ortho hydrogen ratio is adjusted to produce final hydrogen having a final para/ortho hydrogen ratio with a greater amount of ortho hydrogen, The cryogenic hydrogen storage system is refueled with the final hydrogen having a final para/ortho hydrogen ratio with a greater amount of ortho hydrogen.

4 Claims, 9 Drawing Sheets

(56) References Cited

U.S. PATENT DOCUMENTS

| | | | | |
|---|---|---|---|---|
| 3,355,282 A * | 11/1967 | Takayuki | B01J 25/00 502/341 |
| 3,412,042 A * | 11/1968 | Seiichi | B01J 25/00 502/301 |
| 3,794,599 A * | 2/1974 | Dautzenberg | B01J 23/56 502/334 |
| 4,393,039 A * | 7/1983 | Sherman | C01B 3/0089 423/649 |
| 4,671,080 A * | 6/1987 | Gross | F25B 41/02 417/48 |
| 4,793,136 A * | 12/1988 | Whittenberger | B01D 53/9454 422/177 |
| 4,923,109 A * | 5/1990 | Cyron | B01J 35/04 228/173.6 |
| 5,154,062 A * | 10/1992 | Gaumer, Jr. | F25J 1/001 62/54.1 |
| 5,353,849 A * | 10/1994 | Sutton | F17C 5/007 141/18 |
| 6,203,771 B1 * | 3/2001 | Lester | B01D 53/864 422/177 |
| 6,708,502 B1 * | 3/2004 | Aceves | F17C 3/08 220/560.08 |
| 6,810,925 B2 * | 11/2004 | Graham | B60S 5/02 141/18 |
| 6,834,508 B2 * | 12/2004 | Bradley | F17C 11/005 141/110 |
| 6,986,258 B2 * | 1/2006 | Bradley | F17C 11/005 62/46.1 |
| 7,040,119 B2 * | 5/2006 | Bracha | C01B 3/0089 62/51.2 |
| 7,377,294 B2 * | 5/2008 | Handa | B60K 15/00 141/82 |
| 7,938,150 B2 * | 5/2011 | Handa | F17C 5/007 141/285 |
| 8,033,305 B2 * | 10/2011 | Weh | F17C 13/00 141/206 |
| 8,522,834 B2 * | 9/2013 | Okawachi | F17C 5/00 141/2 |
| 9,714,168 B1 * | 7/2017 | White | C01B 3/0089 |
| 2002/0053365 A1 * | 5/2002 | Mutter | F17C 5/06 141/4 |
| 2003/0164202 A1 | 9/2003 | Graham et al. | |
| 2003/0178096 A1 * | 9/2003 | Lacroix | B67D 7/42 141/206 |
| 2003/0209147 A1 * | 11/2003 | Myasnikov | C01B 3/0005 96/146 |
| 2005/0031918 A1 * | 2/2005 | Barber | C01B 3/38 429/411 |
| 2008/0263954 A1 * | 10/2008 | Hammel | B01J 23/882 48/127.9 |
| 2009/0175006 A1 * | 7/2009 | Jou | H01L 23/367 361/710 |
| 2009/0199574 A1 | 8/2009 | Hirose et al. | |
| 2009/0283176 A1 * | 11/2009 | Berry | F17C 13/001 141/1 |
| 2010/0015038 A1 * | 1/2010 | Inoue | F17C 7/02 423/649 |
| 2010/0133279 A1 | 6/2010 | Berry et al. | |
| 2011/0302933 A1 | 12/2011 | Immel | |
| 2013/0142726 A1 * | 6/2013 | Biniwale | B01J 23/464 423/651 |
| 2015/0090364 A1 * | 4/2015 | Elgowainy | F17C 5/06 141/4 |
| 2015/0273446 A1 * | 10/2015 | Kunieda | B01J 35/04 502/67 |

* cited by examiner

ORTHO-H₂ REFUELING FOR EXTENDED CRYOGENIC PRESSURE VESSEL DORMANCY

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to hydrogen and more particularly to hydrogen refueling with reduced hydrogen loss.

State of Technology

This section provides background information related to the present disclosure which is not necessarily prior art.

One of the main drawbacks of low temperature hydrogen storage systems is venting losses, which occur when the vessel pressurizes beyond its rated pressure due to heat transfer between the hydrogen and its surrounding environment. One way to limit that effect is building more efficient insulation devices. However, high performance insulation solutions add volume, mass, complexity and cost to the storage system; all of them needing to be reduced to propose a realistic cost effective commercial solution.

Alternatively, it can be shown that taking advantage of the unique properties of the hydrogen molecule could reduce venting losses using existing compact and cost-effective vessel designs. The hydrogen molecule has two different spin states: in one configuration, its spins are parallel (most energetic form, called ortho-$H_2$) while in a second configuration they are anti-parallel (para-$H_2$ form). Conversion from the low-energy para-$H_2$ to the high-energy ortho-$H_2$ is endothermic. As a result, the rate of pressure and temperature rise will diminish when this conversion is taking place, thus reducing venting losses. The para/ortho-$H_2$ mixture is mainly a function of temperature and is likely to change at a rate that varies with heat transfer and density. Applicants have recently shown that the initial ortho-fraction plays a major role in promoting para/ortho-$H_2$ kinetics. Initial ortho-fraction between 5 and 20% could increase dormancy (the time for which a cryogenic vessel can absorb heat from the surroundings without venting hydrogen vapor) by a factor 2 to 4 depending on temperature, density and volumes.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The disclosed apparatus, systems, and methods provide minimization of venting losses in cryogenic pressure vessels by adjusting the initial ortho-$H_2$ concentration at filling. This application describes, illustrates, and claims apparatus, systems, and methods for fueling a cryogenic hydrogen storage system that reduces hydrogen loss. An initial supply of hydrogen is obtained wherein the initial hydrogen has an initial para/ortho hydrogen ratio. This can be accomplished by a means for obtaining and storing initial hydrogen. The initial hydrogen having an initial para/ortho hydrogen ratio is adjusted to produce final hydrogen having a final para/ortho hydrogen ratio with a greater amount of ortho hydrogen. In one embodiment a final para/ortho hydrogen ration is obtained with a 15 to 20 percent greater amount of ortho hydrogen. The cryogenic hydrogen storage system is refueled with the final hydrogen having a final para/ortho hydrogen ratio with a greater amount of ortho hydrogen.

The disclosed apparatus, systems, and methods have many uses, for example, the disclosed apparatus, systems, and methods have use in hydrogen vehicles that store the fuel in cold conditions (typically cryogenics down to 20 K), and especially well suited for cryogenic $H_2$ pressure vessels that operate over a wide range of temperature (20-300 K) and pressure (1-700 bar) and can be refilled at high pressure and low temperature.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Figure 1:
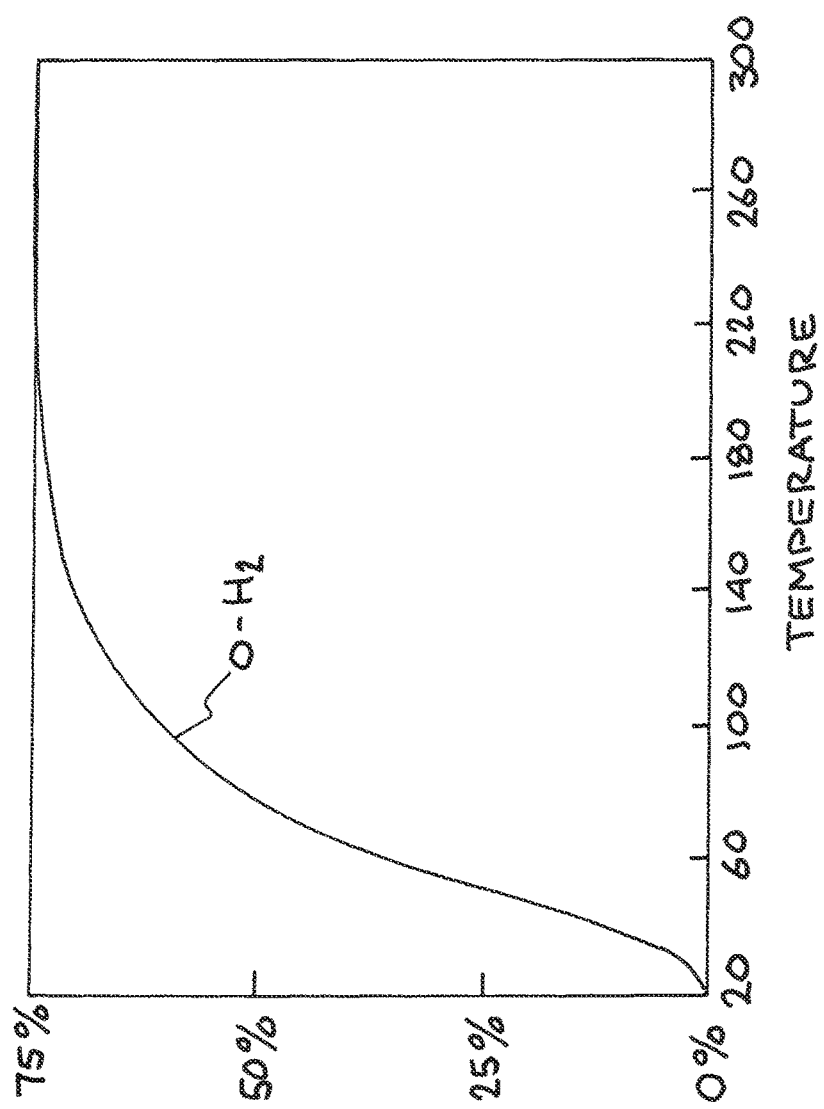
FIG. 1 is a graph that illustrates equilibrium ortho concentration versus temperature.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

Cryogenic $H_2$ storage is one of the most efficient ways to ensure high density and cost-effective storage. For example, the BMW Hydrogen 7 has been the first series production $H_2$ car operated with liquid $H_2$. Cryogenic $H_2$ storage and refueling can be accomplished at hydrogen fueling stations. For example, a hydrogen fueling station can be the type of hydrogen fueling station illustrated and described in U.S. Published Patent Application No. 2003/0164202 by John David Trevor Graham et al published Sep. 4, 2003. The disclosure of U.S. Published Patent Application No. 2003/0164202 is incorporated herein by this reference.

One of the main drawbacks of cryogenic storage technology is the venting losses, due to heat transfer between the cold hydrogen and its surrounding "warm temperature" environment.

In order to limit those losses, Applicants have developed cryogenic pressure vessels that use a high-pressure vessel enclosed in an insulating secondary vessel so that hydrogen is allowed to warm up over a much longer period of time before reaching the maximum pressure, and thus vent. Although this technique represents a major improvement over previously existing technology, venting losses can still occur under certain scenarios, especially for high-density/high-pressure refueling.

Another challenge of cryogenic hydrogen is liquefaction cost. Hydrogen liquefaction is a very energy intensive process. While the theoretical reversible work of liquefaction is estimated to be 3.92 kWh/kg, today's liquefaction plants consume much more energy, between 10.8 and 12 kWh/kg.

A potential approach to reduce boil-off losses takes advantage of the unique properties of the hydrogen molecule. The hydrogen molecule has two different nuclear spin states: in one configuration, its spins are parallel (most energetic form, called ortho-$H_2$) while in a second configuration they are anti-parallel (para-$H_2$ form). Para-$H_2$ is stable at 20 K, and as the temperature increases, the equilibrium shifts toward ortho-H2. At room temperature (300 K) normal-H2 (25% para-75% ortho) is stable as illustrated in FIG. 1. FIG. 1 is a graph that illustrates equilibrium ortho concentration versus temperature.

$LH_2$ is today produced and delivered as essentially pure para-$H_2$ (99.8%). If not fully converted in the liquefaction plant, ortho-$LH_2$ would convert to para-$LH_2$ over a few days in an exothermic reaction that evaporates a large fraction of $LH_2$. When stored in today's low pressure Dewars, most of this evaporated $H_2$ would have to be vented if not used. Ortho-para conversion in today's $LH_2$ plants is responsible for ~30% of the total energy of liquefaction.

Cryogenic pressure vessels, however, introduce unprecedented flexibility that enables favorable manipulation of para-ortho composition. Capable of high-pressure operation, cryogenic pressure vessels may be refueled with partially converted $LH_2$ (para-$H_2$ concentration below 99.8%), enabling reductions in $H_2$ liquefaction energy. Depending on the $H_2$ temperature, this may accelerate evaporation and vessel pressurization. However, it would not cause evaporative losses due to the high pressure rating of cryogenic vessels.

Another advantage of delivering partially converted $LH_2$ is its catalytic effect on para-ortho conversion.

Onboard a cryogenic pressure vessel, $H_2$ will typically warm up if the vehicle is infrequently driven, reaching relatively high temperatures (60-120 K) where equilibrium ortho concentrations are high as illustrated in FIG. 1. If initially filled with para-$H_2$ (or para-$H_2$ rich mixtures), para-ortho conversion would slow down vessel pressurization, considerably lengthening dormancy.

Natural para-ortho conversion is, however, slow. Unless artificially catalyzed, para-ortho conversion may not occur quickly enough to slow down vessel pressurization and avoid venting losses under most conditions.

In-tank para-ortho catalysis with para-magnetic metal oxides is the subject of US. Published Patent Application No. 2009/0199574, but use of external catalysts adds cost and complexity in the system.

The subject apparatus, systems, and methods provide an approach for enhancing para-ortho conversion inside the vessel without introduction of external catalysts. According to the basic theory of para-ortho conversion, ortho-$H_2$ has a magnetic moment and is therefore able to catalyze para-ortho conversion if available in high enough concentration.

Figure 2:
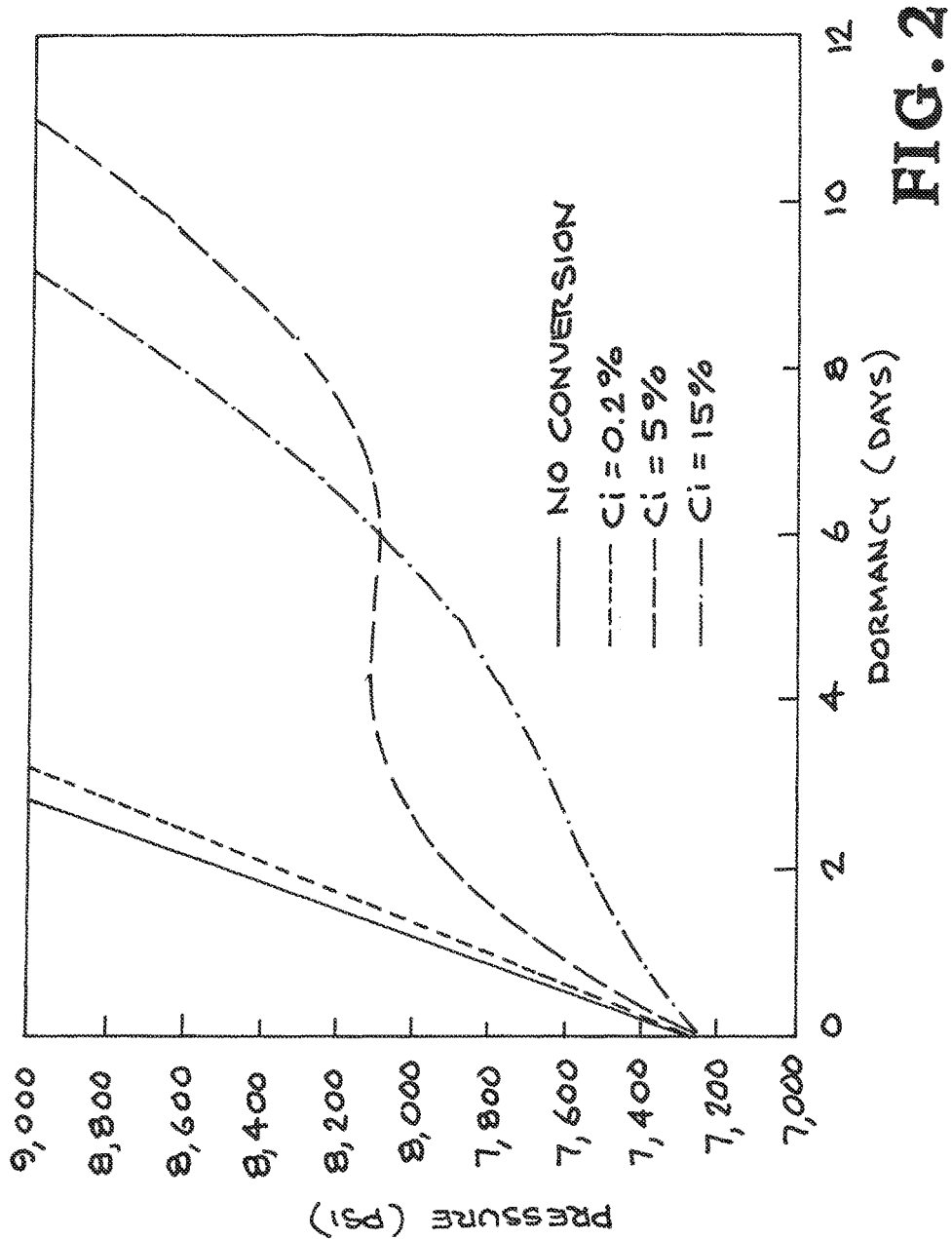
FIG. 2 is a graph that illustrates cryogenic pressure vessel pressurization as a function of parking time for different initial ortho-concentrations (Ci=0.2, 5 and 15%) and for a case with no para-ortho conversion (black solid line).

In the first approach, the liquefaction process is slightly modified by, for example, reducing contact time between hydrogen and ortho-para conversion catalysts to produce and deliver 80-95% para-$H_2$, thereby increasing cryogenic pressure vessel dormancy by as much as a factor of 4 as illustrated in FIG. 2.

Figure 3:
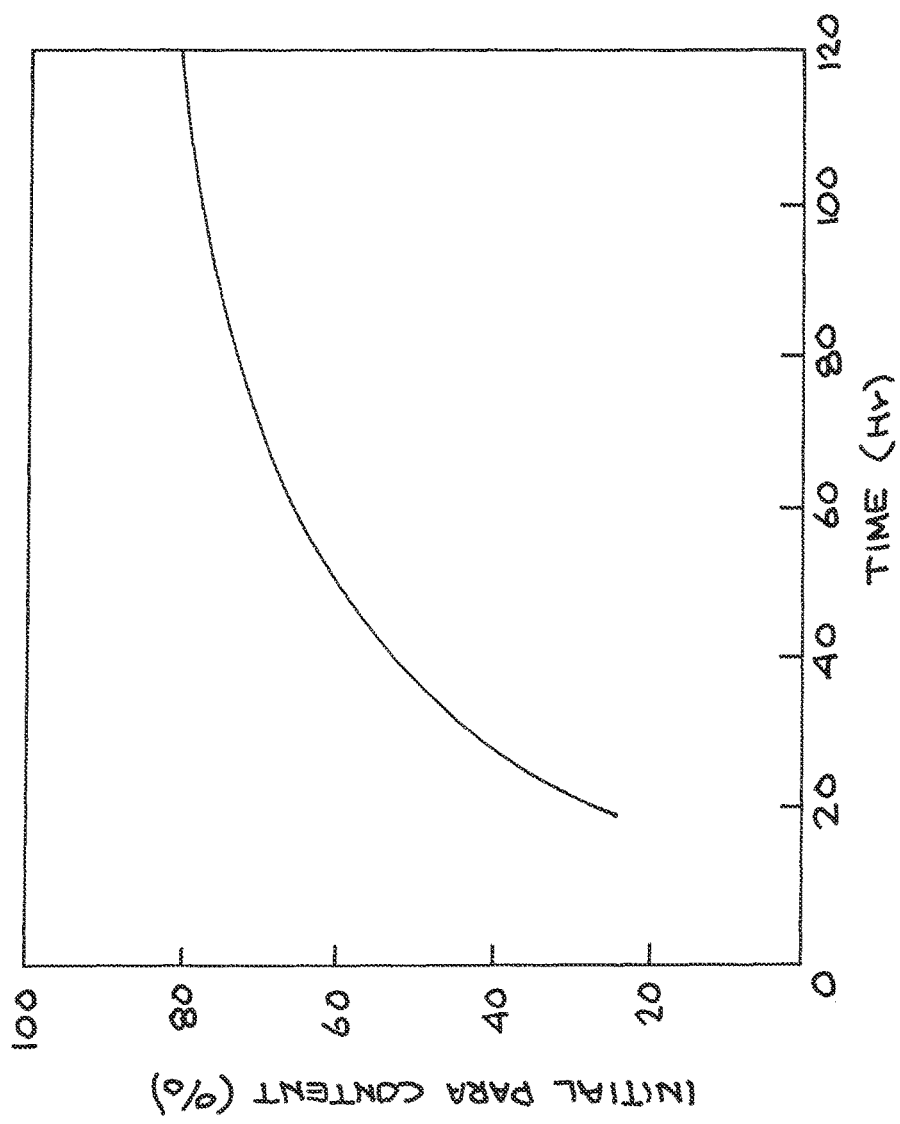
FIG. 3 is a graph that illustrates the breakeven time for partially converted liquid $H_2$. Partial conversion to para-H2 during liquefaction and subsequent storage of partially converted H2 in low pressure Dewars is advantageous with respect to energy consumption if hydrogen is used faster than the breakeven time illustrated in the figure for each initial composition.

Aside from lengthening dormancy, dispensing 5-20% ortho-LH2 has the additional advantage of reducing liquefaction energy (by up to 15%). While evaporative losses may result if partially converted $LH_2$ is stored in low pressure Dewars before utilization or delivery to a cryogenic pressure vessel, the energy trade-off is positive (i.e., savings of liquefaction energy are greater than energy losses due to evaporated hydrogen) unless $LH_2$ is stored for more than 5 days as illustrated in FIG. 3. In mature hydrogen transportation systems $LH_2$ will likely be produced and consumed within a few hours, enabling liquefaction energy savings without venting losses.

FIG. 3. Illustrates the breakeven time for partially converted liquid $H_2$. For each initial composition, a breakeven time exists for which energy cost for conversion equals the energy cost for the vaporized hydrogen. If the hydrogen is used or dispensed into a cryogenic pressure vessel within the breakeven time limit, partial conversion is advantageous with respect to energy consumption In the second approach, $LH_2$ is dispensed as fully converted (99.8%) para-$H_2$ as typically done today.

Conversion to 5-20% ortho-$H_2$ then occurs at the refueling station by means of a catalytic device.

Although most likely stored at the fueling station in a Dewar at near 20 K where equilibrium concentration is essentially pure para-$H_2$ as illustrated in FIG. 1, $LH_2$ will probably be dispensed into cryogenic pressure vessels by a high-pressure $LH_2$ pump similar to those commercially available by Linde and others. These pumps produce a stream of high density $H_2$ at 30-100 K. At these temperatures, equilibrium shifts away from para-$H_2$ as illustrated in FIG. 1, enabling partial conversion to ortho-$H_2$, if catalyzed. Partial conversion of this hydrogen through catalytic action within the hose leading to the vehicle will therefore enable dispensing of 5-20% ortho-$H_2$ that will greatly lengthen cryogenic pressure vessel dormancy.

The first approach would represent a more economical pathway, reducing liquefaction cost at the plant and avoiding the need for catalytic devices at the fueling station. However, this solution would require an improved delivery and consumption schedule management (from the liquefaction plant to the fueling station), with the constraint of having to deliver and dispense hydrogen in a timely manner (within 5 days after liquefaction). Although it is likely that such a timeframe would be possible in a mature $H_2$ economy, this may not be the case yet.

The second approach would not require any change on the liquefaction and delivery scenarios already in place and well known. Although cost would be added to the fueling station (catalytic device), this cost would increase the practicality of the vehicle by avoiding evaporative losses, and it is therefore likely to be a good investment.

Typically, a fueling station dispenses the equivalent of about 1000 kg $H_2$ per day. This is considerably lower than the throughput in typical liquefaction plants. Lower throughput and lower conversion targets (as little as 80% $H_2$ is to be converted) reduces the need for catalyst at the station with respect to the large amounts likely needed at today's liquefaction plants.

Another possible advantage of on-site para-ortho conversion would be an "on demand adjustment" that would enable tuning the ortho-H-concentration to the immediate needs of the driver. For example, a driver on a long road trip is likely to quickly consume the fuel and does not require any conversion at all. An infrequent driver, on the other hand, would benefit from increased ortho-$H_2$ concentration. It can be shown that a difference as little as 2% in ortho content could play a role in boil-off performances.

Finally, para-ortho conversion in the delivery hose would cool down the $H_2$ being dispensed, increasing refueling density and vehicle range, in addition to dormancy. This is an important advantage considering the challenge of compact hydrogen storage.

Figure 4:
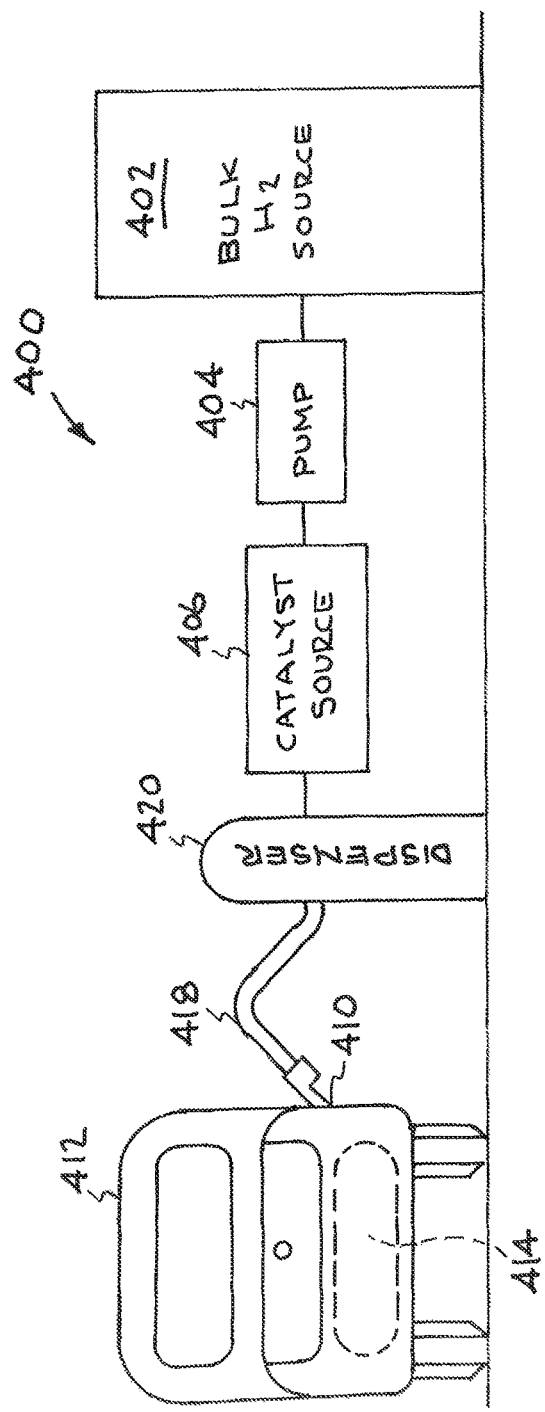
FIG. 4 illustrates one embodiment of a system for refueling a cryogenic hydrogen storage system.

Referring to FIG. 4 a hydrogen fueling station for motor vehicles is illustrated. The hydrogen fueling station is designated generally by the reference numeral 400. The hydrogen fueling station 400 includes a bulk hydrogen source 402 and a pump 404. A catalyst source 406 is connected between pump 404 and the dispenser 420. The hydrogen fueling station 400 receives and stores hydrogen in the bulk hydrogen source 402. The fuel dispenser 420 includes a hose with connector 418 that couples a connectivity device 410 of a vehicle 412 docked at the hydrogen fueling station 400 such that a hydrogen connection is established.

The hydrogen in the bulk hydrogen source 402 has an initial para/ortho hydrogen ratio. In many cases the initial para/ortho hydrogen ratio is close to 100% para hydrogen. The catalyst source 406 provides a system for adjusting the hydrogen having an initial para/ortho hydrogen ratio to a final para/ortho hydrogen ratio with a greater amount of ortho hydrogen. The catalyst source 406 can be a block of copper that acts as a catalyst to adjust the para/ortho hydrogen ratio. The block of copper can have a honeycomb interior. Other catalyst sources can be used as the catalyst source 406. For example an aluminum block can be used as the catalyst source 406.

The hydrogen fueling station 400 provides a system for fueling a low temperature hydrogen storage unit 414 in the motor vehicle 412. An initial supply of hydrogen is provided to the bulk hydrogen source 402 by a supplier. The initial hydrogen has an initial para/ortho hydrogen ratio. The catalyst source 406 provides a system for adjusting the initial hydrogen ratio to produce final hydrogen having a final para/ortho hydrogen ratio with a greater amount of ortho hydrogen.

Figure 5A:
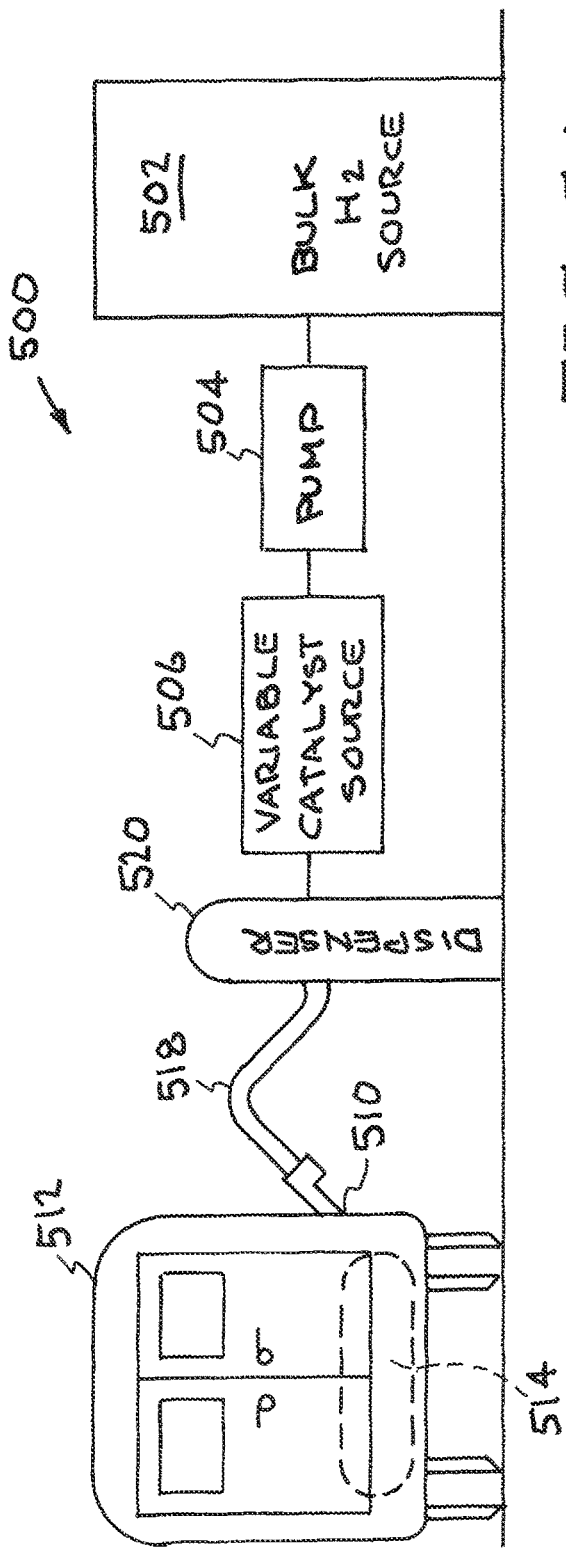
FIGS. 5A and 5B illustrate another embodiment of a system for refueling a cryogenic hydrogen storage system.

Referring to FIG. 5A another embodiment of a hydrogen fueling station for motor vehicles is illustrated. This embodiment of a hydrogen fueling station is designated generally by the reference numeral 500. The hydrogen fueling station 500 includes a bulk hydrogen source 502 and a pump 504. A variable catalyst source 506 is connected between the pump 504 and the dispenser 520. The dispenser 520 dispenses hydrogen into a vehicle 512 through connector 518 that couples a connectivity device 510 of the vehicle 512 such that a hydrogen connection is established.

The hydrogen fueling station 500 receives and stores hydrogen in the bulk hydrogen source 502. The pump 504 directs the hydrogen to the variable catalyst source 506. The hydrogen in the bulk hydrogen source 506 has an initial para/ortho hydrogen ratio. In many cases the initial para/ortho hydrogen ratio is nearly 100% para hydrogen. The variable catalyst source 506 provides a system for adjusting the hydrogen having an initial para/ortho hydrogen ratio to a final para/ortho hydrogen ratio with a greater amount of ortho hydrogen. The variable catalyst source 506 acts as a catalyst to adjust the para/ortho hydrogen ratio.

The hydrogen fueling station 500 provides a system for fueling a low temperature hydrogen storage unit 514 in the motor vehicle 512. An initial supply of hydrogen is provided to the bulk hydrogen source 502 by a supplier. The initial hydrogen has an initial para/ortho hydrogen ratio. The catalyst source 506 provides a system for adjusting the initial hydrogen ratio to produce final hydrogen having a final para/ortho hydrogen ratio with a greater amount of ortho hydrogen.

Figure 5B:
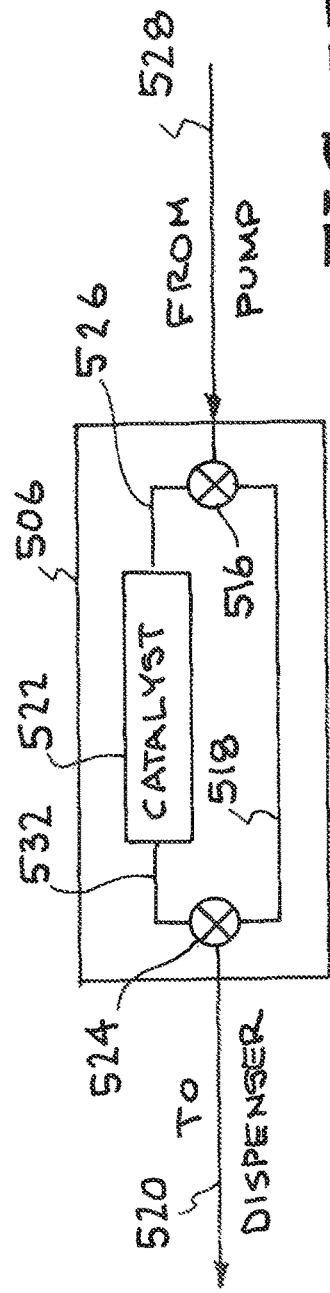

Referring to FIG. 5B the variable catalyst source 506 is described in greater detail. A line 528 provides hydrogen from the bulk hydrogen source. The line 528 is connected to a valve 516. The valve 516 can be positioned to direct the hydrogen directly through line 526 to valve 524 through catalyst 522 and to the line 532 leading to the dispensing pump. The valve 516 can also be positioned to direct the hydrogen directly through a line 518 to dispenser 520. The catalyst 522 provides a system for adjusting the hydrogen having an initial para/ortho hydrogen ratio to a final para/ortho hydrogen ratio with a greater amount of ortho hydrogen. Hydrogen from catalyst 522 is directed to valve 524 and to the line leading to the dispenser 520.

Figure 6:
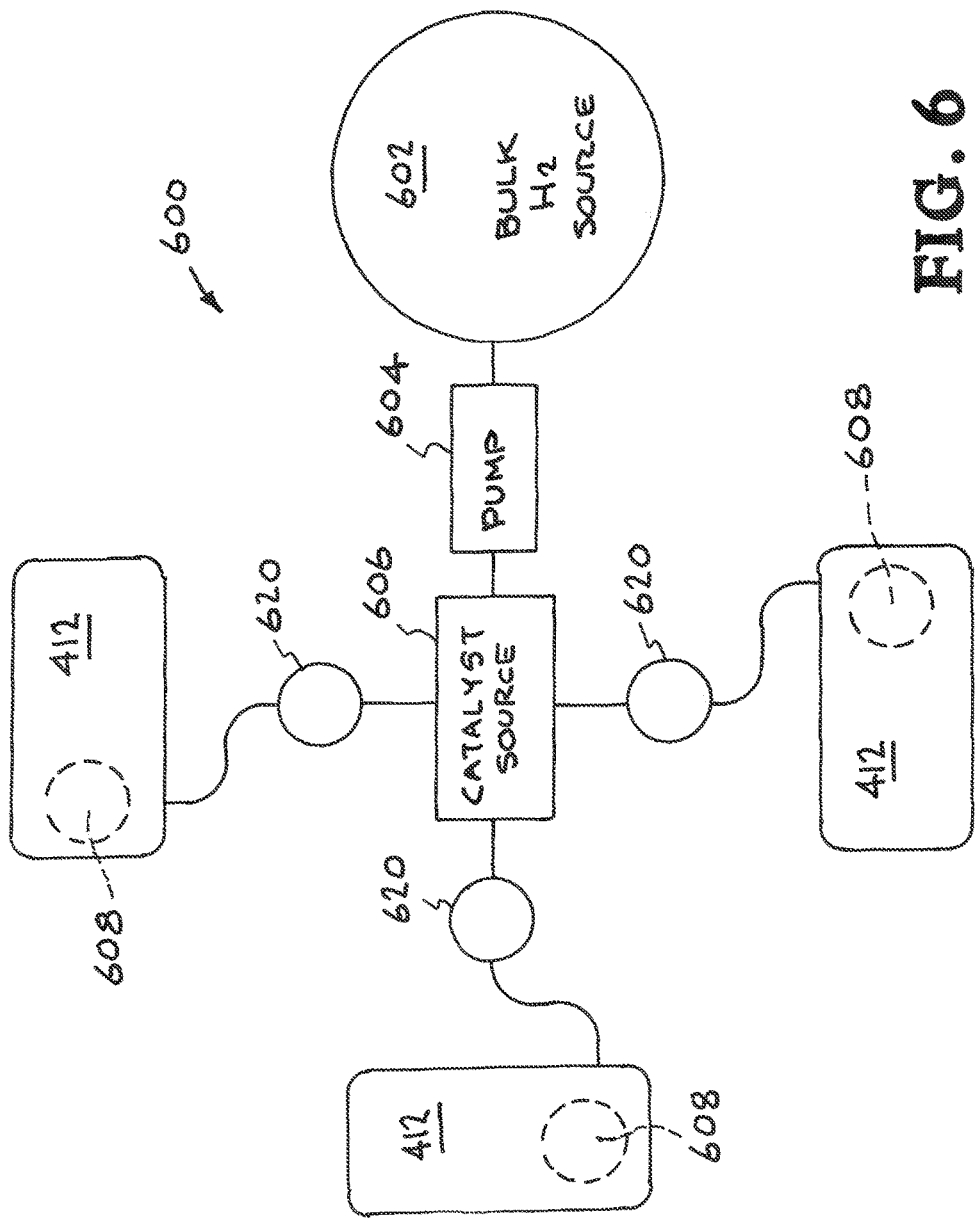
FIG. 6 illustrates another embodiment of a system for refueling a cryogenic hydrogen storage system.

Referring to FIG. 6 another embodiment of a larger hydrogen fueling station for motor vehicles is illustrated. This hydrogen fueling station is designated generally by the reference numeral 600. The hydrogen fueling station 600 includes a bulk hydrogen source 602, a pump 604, and multiple fuel dispensers 620. Three fuel dispensers 620 are shown; however it is to be understood that other numbers of fuel dispensers 620 can be included.

A catalyst source 606 is connected between pump 604 (from the bulk hydrogen source 602) and each fuel dispenser 620. Each fuel dispenser 620 provides fueling of a vehicle 412 docked at the hydrogen fueling station 600. Each fuel dispenser 620 includes a hose with connector that connects to a hydrogen storage unit 608 in the vehicle 412.

The hydrogen fueling station 600 receives and stores hydrogen in the bulk hydrogen source 602. The hydrogen in the bulk hydrogen source 602 has an initial para/ortho hydrogen ratio. In many cases the initial para/ortho hydrogen ratio is nearly 100% para hydrogen. The catalyst source 606 provides a system for adjusting the hydrogen having an initial para/ortho hydrogen ratio to a final para/ortho hydrogen ratio with a greater amount of ortho hydrogen.

Figure 7:
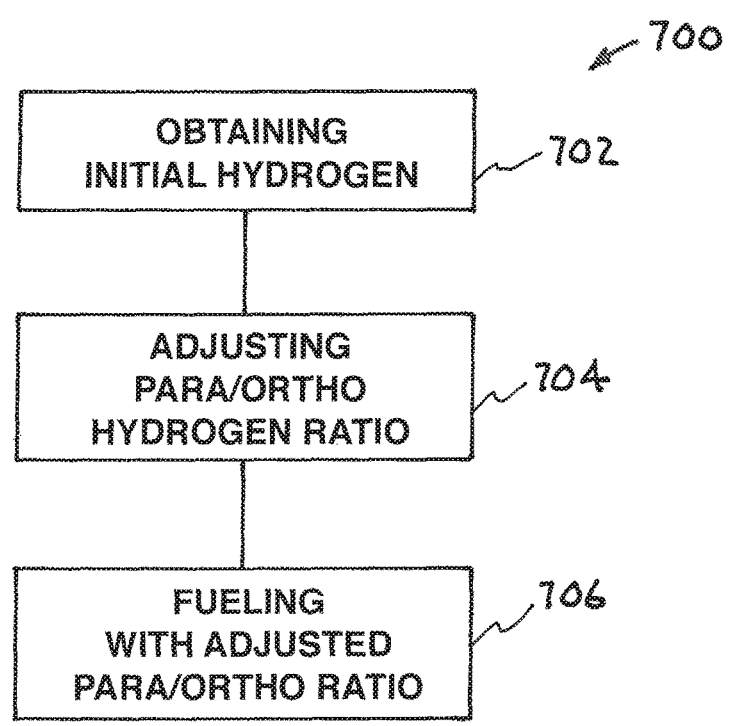
FIG. 7 is a flow chart that illustrates one embodiment of a system for refueling a cryogenic hydrogen storage system.

Referring now to FIG. 7, a flow chart illustrates one embodiment of a system for refueling a cryogenic hydrogen storage system. The system for refueling a cryogenic hydrogen storage system is designated generally by the reference numeral 700. The system 700 reduces hydrogen loss in a system for refueling a cryogenic hydrogen storage system.

In the first step designated by the reference numeral 702, an initial supply of hydrogen is obtained wherein the initial hydrogen has an initial para/ortho hydrogen ratio. In the next step designated by the reference numeral 704, the initial hydrogen having an initial para/ortho hydrogen ratio is adjusted to produce final hydrogen having a final para/ortho hydrogen ratio with a greater amount of ortho hydrogen. In the next step designated by the reference numeral 706, the cryogenic hydrogen storage system is refueled with the final hydrogen having a final para/ortho hydrogen ratio with a greater amount of ortho hydrogen.

Figure 8A:
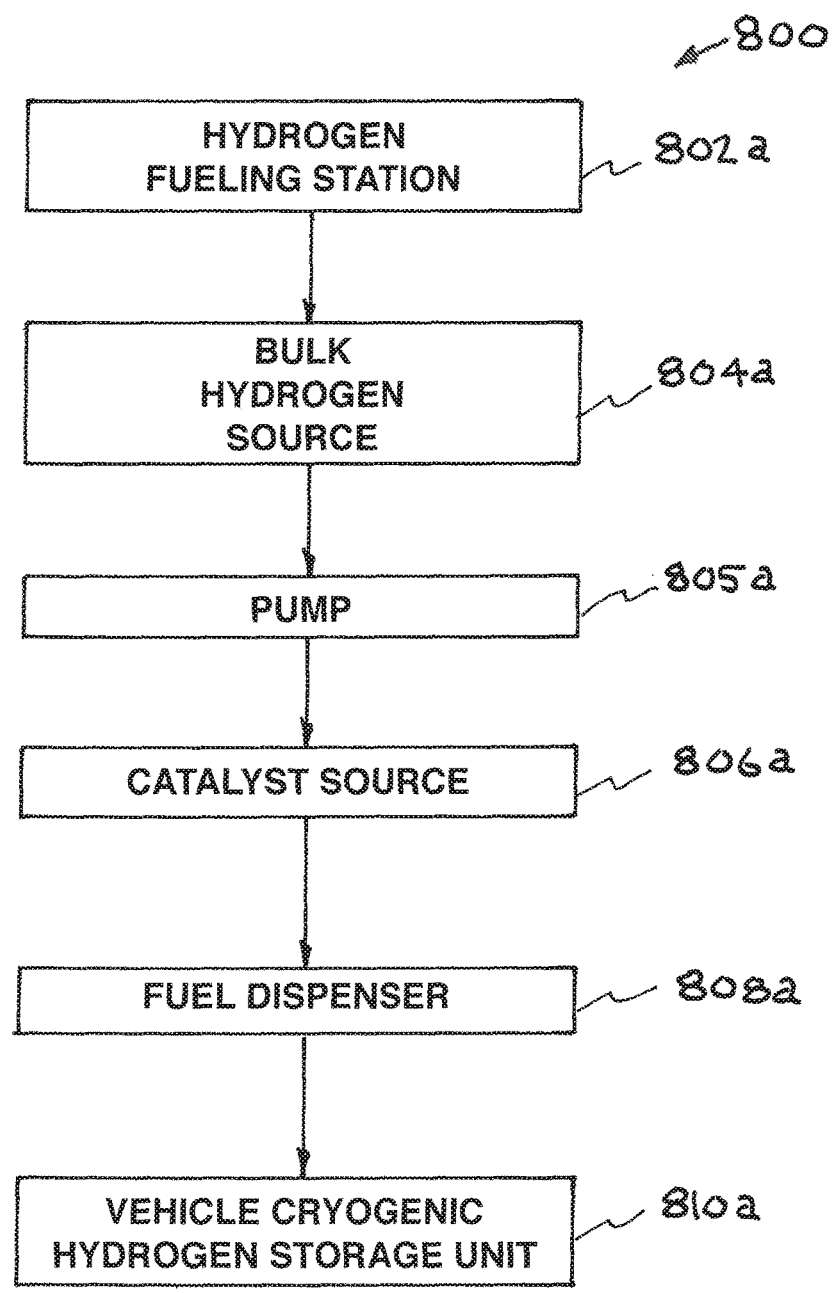
FIG. 8 is a flow chart that illustrates another embodiment of a system for refueling a cryogenic hydrogen storage system.
Figure 8B:
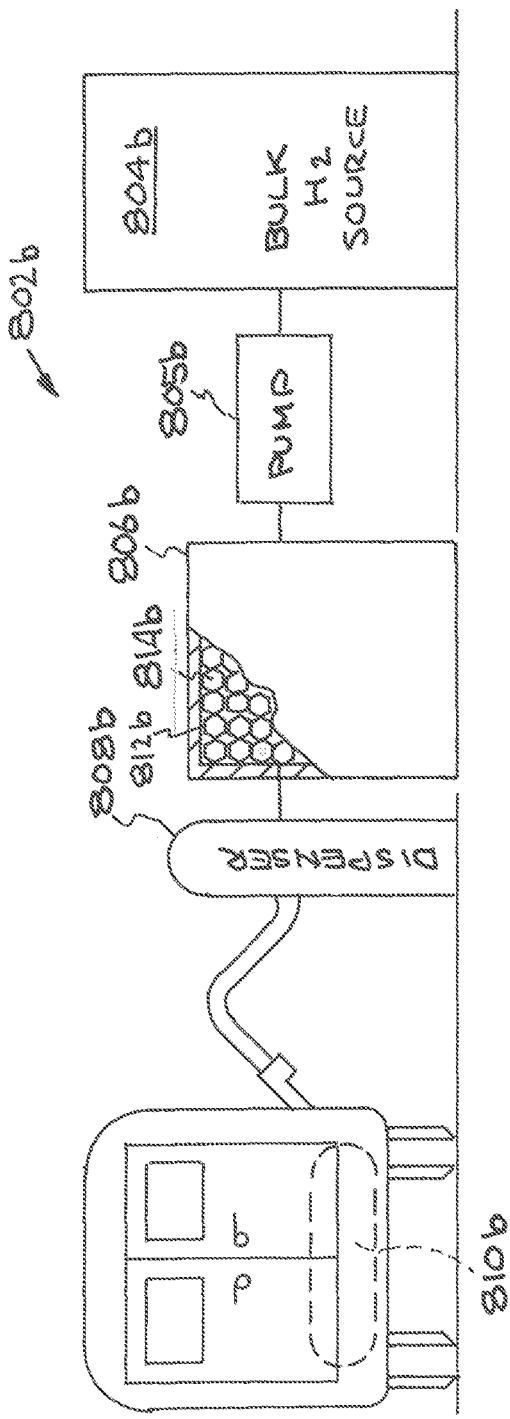

Referring now to FIGS. 8A and 8B another embodiment of a system for refueling using a cryogenic hydrogen storage system is illustrated. The system for refueling a cryogenic hydrogen storage system is designated generally by the reference numeral 800. The system 800 reduces hydrogen loss in the system for refueling a cryogenic hydrogen storage system.

The reference numerals 802a and 802b designate a hydrogen fueling station for motor vehicles. The hydrogen fueling station 802 includes a bulk hydrogen source designated by the reference numerals 804a and 804b and a pump designated by the reference numerals 805a and 805b. A catalyst source designated by the reference numerals 806a and 806b is connected between the 805a and 805b and the fuel dispenser designated by the reference numerals 808a and 808b. The catalyst source 806a and 806b is a metal block 812b with a honeycomb structure 814b.

The hydrogen fueling station 802 receives and stores hydrogen in the bulk hydrogen source 804a and 804b. The dispenser 808a and 808b fuels the vehicle cryogenic hydrogen storage unit 810b in a vehicle docked at the hydrogen fueling station 802. The hydrogen in the bulk hydrogen source 802a and 802b has an initial para/ortho hydrogen ratio. In many cases the initial para/ortho hydrogen ratio is nearly 100% para hydrogen. The catalyst 806a and 806b provides a system for adjusting the hydrogen having an initial para/ortho hydrogen ratio to a final para/ortho hydrogen ratio with a greater amount of ortho hydrogen. The catalyst 806a and 806b can be a block of copper that acts as a catalyst to adjust the para/ortho hydrogen ratio. The block of copper can have a honeycomb interior. Other catalyst sources can be used as the catalyst source 806a and 806b. For example an aluminum block can be used as the catalyst source 806a and 806b.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. An apparatus for hydrogen fueling, comprising:
 a vehicle;
 a cryogenic hydrogen storage unit in said vehicle;
 a connectivity device in said vehicle adapted to establish a hydrogen connection with said cryogenic hydrogen storage unit in said vehicle;
 a bulk hydrogen source containing initial hydrogen wherein said initial hydrogen has an initial para/ortho hydrogen ratio and wherein said initial hydrogen is ninety nine and eight tenths percent para-hydrogen;
 a hydrogen fuel dispenser that includes a hose with a connector wherein said hose with a connector of said hydrogen fuel dispenser is adapted to be connected to said connectivity device in said vehicle to establish a hydrogen connection with said cryogenic hydrogen storage unit in said vehicle;

a hydrogen storage pump connected to said bulk hydrogen source for pumping said initial hydrogen that has an initial para/ortho hydrogen ratio and that is ninety nine and eight tenths percent para-hydrogen;

a catalyst unit connected between said hydrogen storage pump and said hydrogen fuel dispenser that-receives said initial hydrogen having an initial para/ortho hydrogen ratio and that is ninety nine and eight tenths percent para-hydrogen, wherein said initial hydrogen flows to said catalyst unit and said catalyst unit adjusts said initial para/ortho hydrogen ratio to produce final hydrogen having a final para/ortho hydrogen ratio with a five to twenty percent greater amount of ortho hydrogen; and a copper metal block that comprises said catalyst unit;

wherein said hydrogen fuels dispenser fuel said cryogenic hydrogen storage unit in said vehicle with said final hydrogen having a final para/ortho hydrogen ratio with a five to twenty percent greater amount of ortho hydrogen.

2. An apparatus for hydrogen fueling, comprising;

a vehicle;

a cryogenic hydrogen storage unit in said vehicle;

a connectivity device in said vehicle adapted to establish a hydrogen connection with said cryogenic hydrogen storage unit in said vehicle;

a bulk hydrogen source containing initial hydrogen wherein said initial hydrogen has an initial para/ortho hydrogen ratio and wherein said initial hydrogen is ninety nine and eight tenths percent para-hydrogen;

a hydrogen fuel dispenser that includes a hose with a connector wherein said hose with a connector of said hydrogen fuel dispenser is adapted to be connected to said connectivity device in said vehicle to establish a hydrogen connection with said cryogenic hydrogen storage unit in said vehicle;

a hydrogen storage pump connected to said bulk hydrogen source for pumping said initial hydrogen that has an initial para/ortho hydrogen ratio and that is ninety nine and eight tenths percent para-hydrogen;

a catalyst unit connected between said hydrogen storage pump and said hydrogen fuel dispenser that-receives said initial hydrogen having an initial para/ortho hydrogen ratio and that is ninety nine and eight tenths percent para-hydrogen, wherein said initial hydrogen flows to said catalyst unit and said catalyst unit adjusts said initial para/ortho hydrogen ratio to produce final hydrogen having a final para/ortho hydrogen ratio with a five to twenty percent greater amount of ortho hydrogen; and an aluminum metal block that comprises said catalyst unit;

wherein said hydrogen fuel dispenser fuels said cryogenic hydrogen storage unit in said vehicle with said final hydrogen having a final para/ortho hydrogen ratio with a five to twenty percent greater amount of ortho hydrogen.

3. An apparatus for hydrogen fueling, comprising:

a vehicle;

a vehicle connectivity device in said vehicle;

a cryogenic hydrogen storage unit in said vehicle, wherein said connectivity device in said vehicle is adapted to establish a hydrogen connection with said cryogenic hydrogen storage unit in said vehicle;

a bulk hydrogen source;

a hydrogen storage pump connected to said bulk hydrogen source;

a hydrogen fuel dispenser;

a hose connected to said hydrogen fuel dispenser;

a connector connected to said hose, wherein said connecter is adapted to be connected to said vehicle connectivity device; and a catalyst unit connected between said hydrogen storage pump and said hydrogen fuel dispenser, wherein said catalyst unit comprises a copper metal block.

4. The apparatus for hydrogen fueling of claim 3 wherein said catalyst unit is a variable catalyst unit that includes a catalyst, a first valve, a second valve, a first line, a second line, a third line, and a fourth line;

wherein said first line is connected between said first valve and said hydrogen fuel dispenser;

wherein said second line is connected between said second valve and said hydrogen storage pump;

wherein said third line is connected between said first valve and said catalyst; and wherein said fourth line is connected between said second valve and said catalyst.

* * * * *